United States Patent [19]

Tylko

[11] E Re. 28,570

[45] Reissued Oct. 14, 1975

[54] HIGH TEMPERATURE TREATMENT OF MATERIALS

[75] Inventor: Jozef Kazimierz Tylko, Faringdon, England

[73] Assignee: Tetronics Research and Development Co. Ltd., Faringdon, England

[22] Filed: May 13, 1974

[21] Appl. No.: 469,615

Related U.S. Patent Documents

Reissue of:

[64] Patent No.: 3,783,167
Issued: Jan. 1, 1974
Appl. No.: 225,892
Filed: Feb. 14, 1972

[30] Foreign Application Priority Data

Feb. 16, 1971 United Kingdom ..... 4789/71
Feb. 16, 1971 United Kingdom ..... 4790/71
Aug. 18, 1971 United Kingdom ..... 38855/71

[52] U.S. Cl. ..... 13/1; 13/9; 13/31
[51] Int. Cl. ..... H05b 7/00

[58] Field of Search ..... 13/1, 9, 9 P, 31; 219/121 P

[56] References Cited

UNITED STATES PATENTS

| | | | |
|---|---|---|---|
| 3,394,242 | 7/1968 | King | 219/121 P |
| 3,436,465 | 4/1969 | Ruiter et al. | 13/1 |
| 3,449,505 | 6/1969 | Brzozowski et al. | 13/1 |

*Primary Examiner*—R. N. Envall, Jr.
*Attorney, Agent, or Firm*—Dennison, Dennison, Townshend & Meserole

[57] ABSTRACT

Apparatus for establishing a substantially expanded electric arc discharge between a circulating electrode which includes the use of plasma guns, and a coacting stationary annular electrode through which the discharge effluents emerge. Means for introducing particulate material into the expanded arc discharge and operating the latter as an expanded arc furnace for various chemical reactions including the reduction and separation of ores, melting, refining, comminuting, spheroidizing and coating.

34 Claims, 5 Drawing Figures

HIGH TEMPERATURE TREATMENT OF MATERIALS

Matter enclosed in heavy brackets [ ] appears in the original patent but forms no part of this reissue specification; matter printed in italics indicates the additions made by reissue.

---

This invention relates to electric arc discharges and in particular to continuous arc discharges and the application thereof to processing of materials on an industrial scale.

It is well known that treatment of certain substances in high current density electric arc discharges may result in physical changes in the material such as comminution and/or spheroidization, or it may cause the material to undergo a chemical change by virture of dissociation or by reaction with the atmosphere of the discharge or the atmosphere in the immediate vicinity of such discharge. It is also well known that in order to achieve a complete and controlled change in the materials subjected to the action of electrical discharges all such materials must pass through the zone of discharge and their time of residence in this zone must be of a certain controlled duration. Furthermore, in some cases of chemical reactions in order to achieve an effective high yield the products of reactions must be very rapidly quenched and/or removed from the reaction zone in order to prevent the reversal of the reaction or undesired recombination of the products.

Various solutions have been hitherto suggested with this object in mind; for instance, by spreading the electric arc into a fan-like shape.

A variety of systems providing very high temperatures in which the plasma state was obtained have also been suggested. For instance, gases may be converted to substantially fully ionized plasma effluents by passage through an arc constricting means such as is the case with direct current plasma guns. Alternatively, plasmas were also obtained by inductive coupling of radio frequency energy to gases. Although a limited number of compounds and allotropes have been formed by high temperature reactions, it was not generally possible either to establish or even less, utilize new chemical processes at such very high temperatures. Thus in the case of direct current plasma guns, the resulting plasma effluents provided as a rule too high velocities entering the hottest zones of the plasma stream. In addition, injection of large amounts of feedstocks into such streams led frequently to arc instability. Equally, in the case of radio frequency plasmas, only relatively small quantities of feedstock could be introduced without extinguishing the plasma due to the various electron scavenging and related phenomena.

For these and other reasons, in spite of the high temperatures ranging from 5,000°–30,000°K or higher, which were attained in such devices, the effect on the injected feedstocks was very limited and it was not possible to maintain the constant temperature gradient necessary for the recovery of reaction products on an industrially viable scale.

It was generally realized that the requirements for processing materials at very high temperatures necessitates in the first instance the formation and maintenance of a broad, very high temperature reacting zone of substantially larger volume than that hitherto obtained moving with substantially smaller velocities than those of constricted arc plasma guns and capable of entraining and holding large volumes of injected feedstocks without causing discharge instabilities.

Methods of stabilizing and expanding an arc column, namely by rotating a cylinder in which the arc column was contained were known before the Second World War and described by W. Weizel and R. Rompe in "Theorie Elektrischer Lichtbogen und Funken" (Leipzig, Barth, 1949), however such methods although of scientific interest, do not lend themselves to industrial exploitation. The inevitably high thermal losses in the rotating cylinder and inability to inject sufficiently large quantities of feedstocks without affecting the stability of the discharge proved the main obstacles preventing industrial utilization of such devices.

The main aim of the present invention is to overcome the above limitations and offer an efficient and convenient method and apparatus for a large variety of very high temperature processes.

According to the present invention, an electric discharge in the form of a substantially expanded arc column is established between one or more electrodes moving along a closed path and one or more coacting stationary annular electrodes.

The electrode or electrodes moving in a closed path may comprise consumable or substantially nonconsumable electrodes or alternatively, they may be in a form of a plasma gun discharging its plasma effluents towards the stationary annular electrode. Under these circumstances, it was found that with sufficiently high rates of circulation of the electrode above the stationary annular electrode, the arc discharge becomes substantially expanded. If the circulating electrode moves with its longitudinal axis parallel to the vertical axis of the stationary annular electrode, i.e., the circulating electrode describes the latus rectum of a cylinder, a substantially cylindrical expanded arc discharge may be obtained. If on the other hand the longitudinal axis of the circulating electrode is inclined to the vertical axis of the annular electrode, i.e., the circulating electrode describes the latus rectum of a truncated cone, a substantially truncated conically shaped arc discharge is produced. It is the latter form of the discharge which will be described in detail hereunder.

When any of the above types of expanded arc discharge are established, the effluents derived therefrom pass through the annulus of the counter-electrode terminating in a characteristic "tail flame" which is well known to those skilled in the art from the work with annular electrodes in the first decades of this century. Both circulating and annular electrodes may be used for delivering substances into the region of the expanded arc column or the tail flame respectively. For instance, if consumable electrodes are used as circulating electrodes these may be conveniently hollow for that purpose. If a circulating electrode is in a form of a plasma gun, the latter will be of course providing its own plasma effluents which may be further augmented by adding suitable fluids or powders by a variety of well-known methods. The delivery of substances through the annular electrode is carried out by providing a number of small openings on the internal surface of such an electrode or alternatively by providing the inner member of the electrode in a form of a porous surface. Both of the last mentioned variants will provide for the injection of a limited quantity of fluids circulating in the annular electrode. This technique was found particularly useful when a portion of the coolant circulating in the annular electrode may be usefully employed for such injection. As will be seen in the following examples, annular electrodes may be conveniently cooled by a variety of hydrocarbons inter alia oils, the injection of which into the tail flame region may be particularly advantageous.

The term annular electrode shall include for the purpose of this specification also segmented annular electrodes, i.e., electrodes formed from separate segments disposed circumferentially so as to form an annulus. The present invention is equally capable of being performed with various types of power supplies and various electrical connections and polarities. In its variant utilizing a plasma torch, the torch apart from a very brief period during starting when it operates in a nontransferred mode, acts preferably as a cathode, while the annular electrode acts an anode. Where a plurality of annular electrodes are employed these may be arranged at increasing electrical potential according to their distance from the circulating electrode. When a circulating electrode is of a consumable type, which may also be hollow, it may be advantageous to operate with a reverse polarity, i.e., making the circulating electrode an anode and the annular electrode a cathode and thereby dissipate proportionally larger quantities of heat in such electrodes. The invention may also utilize A.C. supplies or A.C. supplies with a superimposed D.C. component. One aspect of such operation envisages the use of a segmented annular stationary electrode, in which each segment is connected to one phase of the A.C. supply while the circulating electrode is connected to the return or "neutral" terminal of such supplies.

Conveniently, the expanded arc column of the invention may be initiated by lowering the circulating electrode into proximity with the stationary annular electrode so as to reduce the original interelectrode distance and by injecting a high voltage H.F. component in order to preionise the gap. In the case of a circulating electrode comprising a plasma gun, the latter is made to operate initially at a reduced power in a nontransferred arc mode which may also be conveniently achieved with H.F. preionization and when the plasma effluents provide an electrically conducting path to the stationary annular electrode, the arc becomes transferred to the said annular electrode. Upon transference of the arc to the annular electrode, the circulating electrode is slowly withdrawn with simultaneous raising of the power delivered by the supplies and increasing of the rate of circulation. In this manner, the arc is extended and expanded preferably simultaneously until the required and predetermined geometry and electrical parameters are obtained. In view of the novelty and in order to explain many of the intrinsic features arising therefrom, the expanded arc column of the present invention will now be described with particular reference to the truncated conical type of such an arc developed between a circulating plasma gun acting as a cathode and a stationary annular electrode acting as an anode.

When a circulating plasma gun moves above the stationary electrode so that the longitudinal axis of the plasma gun is inclined to the vertical axis of the annular electrode, a latus rectum of a cone is described by the axis of the gun lying below the point of intersection with the vertical axis of the annular electrode. In such circumstances it is possible to adjust the above angle of inclination in such a way that the downward extended axis of the plasma gun will describe a circle concentric with and of approximately equal radius to that of the internal radius of the annulus of the stationary electrode. When the plasma gun circulates slowly at a rate of a few revolutions per minute and operates with relatively large gas flows of the order of 7 cfh per $mm^2$ of the arc constricting channel, the resulting arc when transferred to the annular electrode is in the form of a sharply defined high velocity and high viscosity jet whose length cannot be easily extended without causing considerable instabilies and eventual extinction. Such an arc glides along the surface of the annular electrode with a characteristic bell shaped anode attachment region and a scanty tail flame comprising occasional anode streamers. The geometry of such an arc is in every respect the same as that issuing from a stationary plasma gun. However, when the plasma gun is made to operate with substantially reduced gas flows and the rate of circulation substantially raised, e.g., to 500 rpm, the resulting arc rapidly fills the interelectrode space taking a characteristic truncated cone shape and producing a stubby tail flame below the annular electrode. The stability of such an expanded arc is greatly improved and is now capable of being considerably extended in length by withdrawing the circulating plasma gun towards the point of axis intersection. Expanded arc columns of this type may be represented by volumes of revolution bounded by portions of curves ranging from the exponential $x = e^y$ to an ellipse evolute of the parametric equation: $x = a \cos^3\theta$; $y = b \sin^3\theta$.

On consideration of the geometry and dynamics of arc columns expanded as hereabove described, it was noted that such columns provide a particularly stable, self-restoring configuration which is in part ascribed to the presence of the precessive forces developed therein and their interaction with other magnetohydrodynamic components. While the full formal analysis of such expanded arc columns has not yet been completed, further important experimentally derived data have been obtained which are summarized below:

1. The expanded arc columns of the present invention in general and the truncated conical expanded arc column in particular, easily entrain particulate matter offering as the "quickest line of descent" a complex spiral which greatly contributes to their time of residence in the expanded arc column;

2. The expanded arc columns are capable of entraining exceptionally large quantities of particles introduced in the vicinity of the upper region of the said column;

3. The expanded arc columns provide a particularly efficient mode of heat transfer to the matter entrained therein which is also attributed to the large degree of turbulence prevailing in the said columns;

4. The expanded arc columns are relatively free from the electron scavenging effects experienced with other types of arcs which may be explained partly by the presence of the central core of such columns which is substantially fully ionized and partly derived from the debris of the matter introduced to the said columns;

5. The expanded arc columns are capable of operating at high voltages with virtually any type of D.C. and/or A.C. supplies including D.C. drooping voltage and D.C. constant current type supplies. It is also possible to operate such expanded arc columns at arc voltage approaching closely the open circuit voltages of the supplies resulting in a very good power factor.

In addition to the above, very advantageous features of the invention, it also falls within the scope of the invention to operate the expanded arc columns at circulation rates which do not provide for the establishment of a completely expanded arc, viz., by allowing a sector subtended at the annular electrode to be free of the discharge. Such mode of operation contrary to first expectations, will not permit the passage of untreated by arc matter through the annular electrode, but will further increase turbulence in the column.

When the expanded arc column as hereinbefore described is placed in a refractory shell isolating the expanded arc column and its tail flame effluents from the ambient atmopshere, the resulting system will comprise a novel type of very high temperature furnace hereafter referred to as an expanded arc furnace. This important variant of the present invention will now be described with reference to FIGS. 1, 2, 3, 4 and 5 in which.

Figure 1:
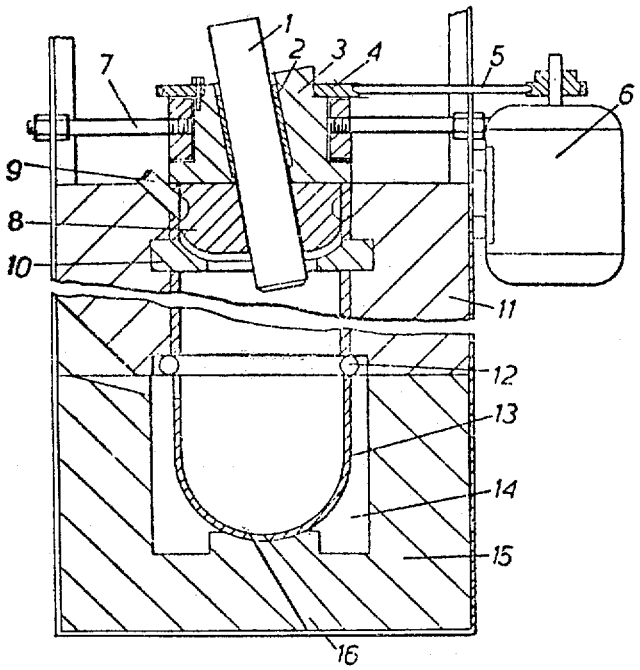
FIGS. 1, 2 and 3 represent diagrammatic sectional drawings of one embodiment of the present invention, namely different aspects of an expanded arc furnace.

In FIG. 1, the circulating electrode 1, which may comprise a plasma gun or other type of electrodes as mentioned hereinbefore, is mounted slideably in a cylindrical bushing 2, which is permanently mounted in the body of the rotor 3. Circular plate with peripheral sprockets 4, is also attached to the body of the rotor 3, and driven through the chain drive 5, by an electric motor 6. The whole rotor assembly is supported in its own bearings by means of symmetrically disposed rods 7, only two of which are shown. Immediately below the rotor body 3, and firmly attached to it is a refractory member 8, with a channel for the sliding electrode, e.g., a plasma gun 1. One of the many possible means of dispensing feedstocks into the upper zone of the expanded arc columns is through feedstock delivery duct 9, leading tangentially to a circumferential groove in the refractory rotor member 8. The tangentially injected particles of feedstock are spread circumferentially in the groove of the refractory member 8, prior to their descent through the passage defined by the refractory rotor member 8, refractory lining of the furnace and the annular disc 10. With this arrangement, a uniform cylindrical curtain of feedstock descends on the upper portion of the expanded arc column providing optimal utilization of the said column and an efficient heat shield protecting the refractory walls of the upper shaft of the furnace. Alternatively, means for feedstock dispensation also successfully practiced are provided by a feedstock delivery duct (not shown), pointing directly at the upper extremity of the expanded arc column. Such an arrangement is applicable with high rates of rotor revolution, i.e., at and above 300 rpm when the circumferential component of force of the rotating column is capable of rapid and uniform distribution of feedstock. The upper shaft of the furnace is surrounded by a suitable refractory material 11, which may be of a single or composite nature contained in a steel shell. The innermost layer of refractory, i.e., that exposed to the expanded arc column effluents and the furnace products, may comprise high grade orthodox refractories selected according to the nature of the contacting media. However, in view of the prevailing high temperatures and high reactivities of many constituents at such temperatures, it was found experimentally that refractories treated according to the process disclosed in the British Pat. Specification No. 1,201,911, and the corresponding foreign Letters Patent are particularly suitable in view of their totally non-porous and non-wetting nature.

The upper shaft of the furnace terminates and is in contact with the stationary annular electrode 12, which may, as represented in FIG. 1, comprise a tubular torus of circular cross-section connected to the positive terminal of the D.C. supplies. A suitable coolant circulates through the tubular passage and may be heat exchanged in a closed circuit or alternatively fractionally bled into the furnace as mentioned hereinbefore. Immediately below the annular electrode 12, disposed axially is a collector 13. The collector shown comprises a crucible mounted on a lower refractory assembly 15. The crucible is vented by a side duct (not shown) and may be tapped at the bottom by a duct 16. A void space 14, isolating most of the collector 13, from the main refractory assembly is utilized for preheating of the collector to reduce the initial thermal shock that may be caused by sudden exposure to the very high temperature effluents. Conveniently, preheating of the collector may be accomplished by means of a burner or electrically by means of resistance-radiant elements.

It is to be understood that FIG. 1, shows one embodiment for exploratory work on different feedstocks and power levels not exceeding 200 kw. The diagrammatic representation does not reveal in the section shown an additional duct in the wall of the furnace below the rotor assembly which may be utilized for the controlled withdrawal of certain easily condensable gases or vapours nor does it show the diagnostic instrumentation such as sampling probes, oxygen potential probes, windows for optical pyrometers, manometers and others. Inclusion of all these and substantial departure from the shapes, volumes and disposition of the product collecting and treating vessels as well as other modification of the rotor assembly, and its power transmission as well as dispensing of feedstocks also fall within the scope of the invention.

Figure 2:
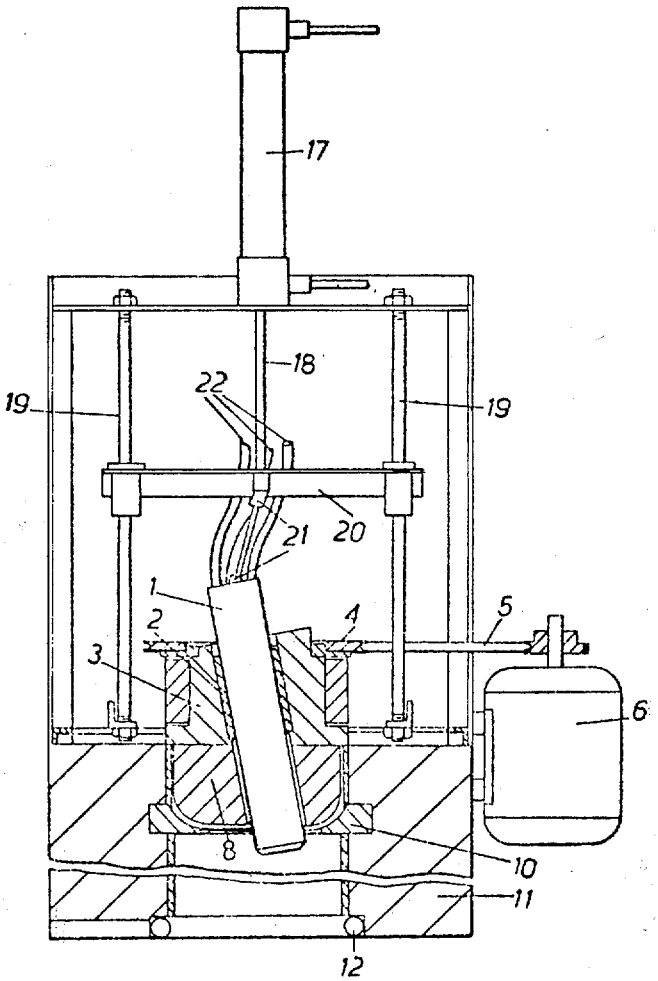

FIG. 2 shows another embodiment of the invention concerned with the method and means of providing for the lowering and raising of the circulating electrode and in particular where the said electrode comprises a plasma gun. The upper portion of the cylinder holding the plasma gun 1 is connected through a rod carrying two universal joints 21 to a piston rod 18 passing at the lower end through a locating cross member 20, which in turn is slideably mounted in two vertical rods 19. The upper end of the piston rod terminates in a piston moving in the piston cylinder 17 in response to the force exerted by the working fluid which may be applied at either end of the cylinder 17. According to this arrangement, the flexible ducts 22, supplying the power, gases and coolant to the plasma gun, are exposed to minimal flexural fatigue while the lowering of the plasma gun for the purpose of starting the arc discharge and raising the plasma gun to achieve optimal extension of the expanded arc column may be easily accomplished and automatically controlled and regulated with reference to other operational parameters, e.g., arc voltage, current feedstock supply, etc., while the plasma gun is circulating.

Figure 3:
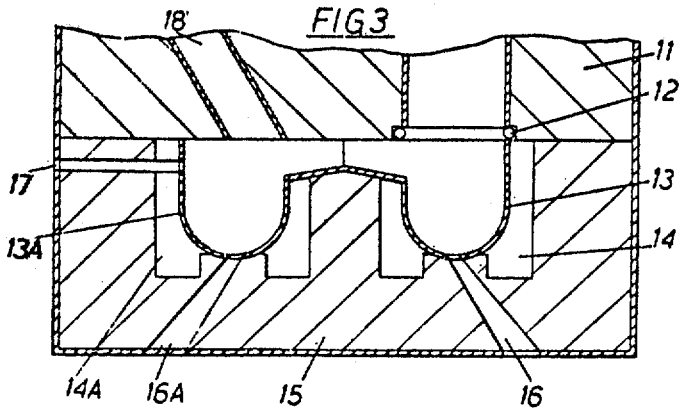

FIG. 3 illustrates yet another embodiment of the present invention in which the products are collected in two crucibles 13 and 13A, with mutually abutting extended lips forming a connecting passage. Both crucibles are provided with means for tapping 16 and 16A. A flue duct 18 is provided above the crucible 13A as well as an additional duct 17 entering the upper wall of crucible 13A. The crucible 13 perheating space 14, is connected and extended to the preheating space 14A which surrounds crucible 13A. In this embodiment of the invention, provision is made for gravity separation of the products collecting in crucible 13 where the heaviest fraction of the product may be periodically or continuously tapped through the tapping duct 16, while the lighter product or products may be made to overflow over the abutting lips of the crucibles 13 and 13A and collect in crucible 13A for subsequent tapping through the duct 16A. In this mode of operation, the lighter product fraction overflowing from crucible 13 to crucible 13A may be advantageously exposed to the influence of new or modifying reagents such as gaseous streams or gaseous streams carrying entrained particles which may be conveniently introduced through duct 17 or other ducts (not shown) making said streams come into counter or co-current contact with the products entering crucible 13A.

The above embodiment provides an important feature of the invention according to which lighter fractions of the products collecting after passage through the expanded arc column and tail flame region may be transferred to another collector by passing over a region defining substantially shallow product flow similar to that encountered in reverbatory furnaces, while exposing the extended surface of the said shallow product flow to a substantially different reactive environment from that prevailing in the first collector. In particular, the above embodiment of the invention provides means for further separation and for conversion of the slag forming constituents. According to particular requirements, the above reverbatory stage may comprise a controlled reduction or controlled oxidation step leading to further isolation of another constituent of the feedstock with or without further isolation of other constituents, e.g., by such methods as refining, burning out, fuming, or recombination with subsequent development of yet another substantially separable phase or phases.

The scope of the present invention as hereinbefore illustrated with reference to FIG. 3 is not to be construed as limited to the type and shapes of the product collecting and treating means shown therein. Thus, other types and shapes of product collecting and treating vessels and other means of exposing the said products to the actions of new environments as are well known and practiced in the art of pyrometallurgy, fall also within the scope of the invention.

Equally, it falls within the scope of the present invention to provide in combination with the expanded arc furnace means for additional introduction of oxidizing reducing or neutral atmospheres as well as means for rapid quenching of the reaction products such as injection of the said products into a stream of rapidly expanding substantially cold gases which are non-reactive with the said injected products.

It also falls within the scope of the invention to impose upon the expanded arc columns or upon the tail flame region, a radio frequency field such as is currently used for the purpose of induction melting or of higher or lower frequencies as dictated by the diameter and height of the expanded arc column or the tail flame region. Such additional imposition of radio frequency fields or even audio frequency fields upon an already preionized expanded arc column and its effluents, namely the tail flame, have shown considerably more efficient coupling of the energy contained in the said radio or audio frequency fields to the said expanded arc column or its effluents than hitherto accomplished by imposition of radio frequencies upon substantially cold gases or unexpanded arc discharges. Conveniently, the said alternating fields may be provided by mounting a suitable output coil of a generator in the walls surrounding the expanded arc column or preferably in the walls surrounding the tail flame effluents of the said expanded arc column.

Figure 4:
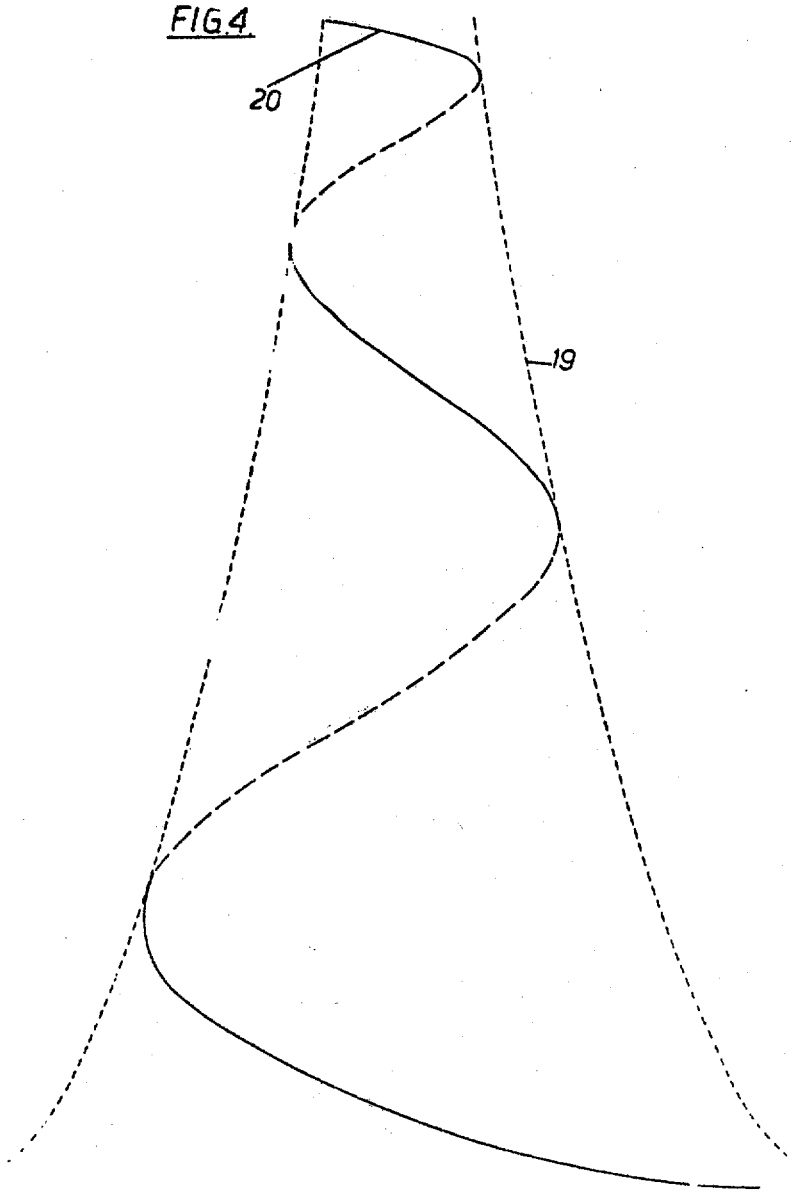
FIG. 4 represents diagrammatically one type of the expanded arc column of a truncated cone shape, with a typical path followed by an injected particle.

FIG. 4 represents diagrammatically and on a reduced scale a cross-sectional view of one type of an expanded arc column bounded by a volume of revolution of a portion of a curve 19, corresponding closely to the equation of an evolute of an ellipse. The upper extremities of the said column are truncated by the plane of circulation of the plasma gun extremity, while the bottom boundary is defined by the inner diameter of the stationary annular electrode. Curve 20 represents one of the many planar projections of a line of descent of a particle coming into contact with such a column.

Figure 5:
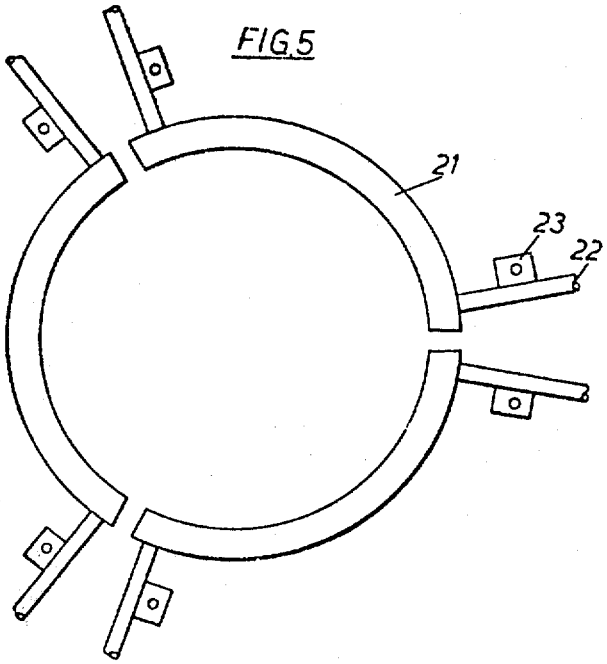
FIG. 5 represents diagrammatically a plan view of one type of a segmented annular electrode as envisaged by the invention.

FIG. 5 represents diagrammatically a plan view of a segmented, stationary annular electrode as used with a wholly or partly A.C. type of supply, in which each segment 21 is connected to one phase of the three phase supply, while the return line is applied to the circulating electrode. Each segment is provided with a coolant duct 22 and preferably two lugs 23 for the supply of a given phase close to the extremities of each segment.

Further advantages derived from the practice of the present invention not immediately obvious to those skilled in orthodox pyrometallurgy will now be described.

When a plasma gun is employed as a circulating electrode experience has shown that there is no troublesome accumulation of deposits such as are frequently encountered with stationary plasma guns where extensive dendritic or amorphous structures lead to frequent stoppages and considerable lowering of efficiency. The absence of such deposits in the furnace of the present invention is ascirbed to the action of the centrifugal forces.

In contrast to other plasma arc furnaces, the expanded arc furnace of the present invention has exhibited consistently low rates of wear. For instance, the parts most exposed to the arc effluents such as the cathode and constricting member of the circulating plasma gun showed no visible wear after 100 working hours and equally the wear of the stationary annular electrode was minimal, representing metal loss of less than one per mille total weight after over 100 working hours. This particularly low wear of the annular electrode is attributed to the rotation of the expanded column which prevents the formation of hot spots. Another contributing factor is the continuous and uniform flow of liquid and gaseous products over the surface of the annular electrode exposed to the arc. Thus the furnace of the invention is capable of operating continuously lower investment and running cost per unit output.

A further advantage of the invention lies in its versatility, namely the furnace may operate with all kinds of atmospheres or mixtures thereof which may be derived from the gases forming the original plasma effluents and gases and from liquids and solids introduced at any level to the furnace space. Such versatility allows a high degree of control over the temperature, enthalpy, chemical potential, composition and other operating parameters of the furnace. As the temperature and rate of heat transfer of the expanded arc furnace are very considerably higher than those of orthodox devices, the expanded arc furnace as hereinbefore disclosed may be adapted to perform more efficiently many of the orthodox extractive, refining and alloying processes. In particular, the expanded arc furnace of the present invention may perform the functions of:

1. Calcinating as carried out in kilns, e.g., rotary and similar furnaces used for the decomposition and elimination of volatile products from ores and concentrates, typically carbon dioxide and water. The efficiency of calcinating processes depends on the rate of decomposition and this is in turn dependent on the rate of heat transfer into the particle, the very high temperature and high turbulence (permitting rapid elimination of the evolved gases and vapours) as created in the expanded arc furnace provide an extremely rapid and efficient mode of calcining.

2. Roasting as performed in shaft furnaces, rotating kilns, multi-hearth roasters, blast roasters, and various other types of fluidized bed roasters, which may be directed to such operations as sulphation, oxidation, volatilization, halogenation reduction, carburization, magnetization and sintering. All types of roasting may be carried out in the expanded arc furnace, e.g., exothermal or endothermal roasting giving considerably higher throughputs than any of the above mentioned orthodox installations. In general, when roasting operations are carried out in the expanded arc furnace, the rate of feeding is considerably increased while the time of residence is rather short. Such conditions are best attained with expanded arcs of wide base and very high rate of electrode circulation.

3. Smelting as carried out in blast furnaces, reverberatory furnaces, electric furnaces, flash smelting furnaces, fluidized bed furnaces and others may be particularly conveniently and efficiently carried out in the expanded arc furnace. When used in the smelting or other modes as hereinafter described, the accumulating products in the collector, e.g., hearth, may be included in the main electric circuit of the expanded arc. The invention may be practiced accordingly either by removing the stationary annular electrode from the circuit altogether, or by maintaining it at a power potential with respect to the circulating electrode than the potential applied to the products in the collector. Conveniently, the electric connection to the collector products may be achieved by making the collector or its products contacting surface from an electrically conducting refractory material, e.g., graphite or silicon carbide. When used in the above mode, the invention may also be applied to submerged arc refining processes. Under such circumstances further slag forming additives may be added directly to the collected products or alternatively at a level substantially above the level of the collected products.

In its smelting mode, the present invention is particulary applicable to the smelting of oxide ores, e.g., iron ores, magnetite and hematite and to the smelting of sulphide ores. A particularly advantageous feature in smelting the sulphide ores according to the present invention is the highly advantageous ability to withdraw from the reaction zone a substantially large proportion of the sulphur in its elemental state thus overcoming the highly cumbersome and potentially polluting step of the removal of sulphur in the form of sulphur dioxide. Other ores may also be smelted including some of the refractory ores which hitherto did not respond to direct reduction by pyrometallurgical processes such as rhodonite ores comprising in excess of 40 percent of manganese silicate. Other reductive smeltings, e.g., smelting of silica with carbon or carbonaceous materials for the production of silicon may also by practiced according to the invention.

4. Melting and Refining of metals in general, and melting of copper cathodes as obtained from electrolytic deposition in particular also falls within the scope of the present invention which offers considerable advantages over existing methods in which fuel gases and oxygen are used leading frequently to the contamination of the metal.

This aspect of the present invention will now be described with reference to the melting of copper cathodes. It is well known to those skilled in the art that melting of such cathodes requires considerable skill to avoid contamination of the copper with oxygen and sulphur as well as avoiding the pick-up of iron from the refractories. As will be shown below, the present invention overcomes these difficulties and in addition offers further advantages such as:

a. high degree of uniformity of the product without the need of adding slag forming materials;

b. rapid, continuous delivery of metal for casting without the need of holding large quantities of melt;

c. the ability to produce a high and consistent degree of desulphurization;

d. the ability to produce a high and consistent degree of deoxidation by the phosphorous, boron and other methods;

e. the ability to produce uniform dispersion in the melt of special additives, e.g., such as used for fine particle strengthening of metals;

f. ability to alloy in the adjoining collector;

g. reliance on purely electrical route without the need of relying on chemical fuels and thereby creating potential risks of contamination;

h. high mass throughput per unit volume of the furnace;

i. very low refractory wear and substantially total absence of contamination from that source;

j. low costs of installation and low operational cost as compared with existing electric furnaces, reverbatory furnaces or vertical fuel fired furnaces.

Also in accordance with the invention, there is provided a method of melting copper shapes by feeding the said shapes into or into the vicinity of an expanded arc plasma discharge derived from substances providing reducing or neutral atmospheres so as to prevent ingress of untoward amounts of oxygen into the molten copper.

In practicing this aspect of the present invention, copper shapes which in practice comprise copper cathodes of rectangular or square prism shape are fed through a number of inclined channels surrounding the upper portion of the furnace above the counter electrode. In this embodiment of the invention, the said channels are rectangular in cross-section and lead into the furnace space above the counter electrode, their respective exits defining an incomplete regular polygon. Copper cathodes are fed through these channels and allowed to descend under gravity, their full rate of descent may be reduced by the friction applied by a set of spring-loaded rollers provided in the upper portion of the said channels. The whole operation of supplying the cathodes to the furnace may be fully automated by provision of suitable conveyors, guides, and loading devices as well known to those skilled in the art. The copper cathodes fed into the plasma furnace by the above or similar means, enter the expanded plasma arc column and undergo rapid melting. In this mode of operation, there is no fragmentation of solid copper (as is the case of vertical fuel fired furnaces used for this purpose), but instead a copious flow of liquid copper droplets takes place. It is believed that the formation of such droplets is greatly enhanced by the complex magnetohydrodynamic forces present in the rotating expanded plasma arc column operating in the furnace. During laboratory experiments formation of such droplets and their fall through the stationary electrode annulus and the "tail flame" trailing from the said annulus was clearly observed. Furthermore, as is well known from similar pyrometallurgical operations, formation of liquid metal droplets greatly enhances further refining of the metal, and in this case further deoxidation. Conveniently, after its fall through the expanded plasma arc column and the tail flame, the metal collects at the bottom of the furance wherefrom it may be continuously withdrawn for casting into semi-finished forms, for example, ingots, cakes, bars, billets, rods, etc.

One of the most important advantages of the present invention lies in its ability to totally and extremely accurately control the ambient atmosphere in which the melting and collecting of the metal takes place. Accordingly, furnace atmospheres are provided by introducing relatively small volumes of carbonaceous substances which conveniently may be introduced into the upper portion of the expanded plasma arc discharge. Such carbonaceous substances may comprise any hydrocarbons, pulverized coke, coal, oils and other carbon containing materials. Other reducing atmospheres may also be utilized for instance, carbon monoxide, hydrogen and mixtures thereof. Conveniently, reducing atmospheres may also be obtained by feeding ammonia or cracked ammonia gas. It has been found that a large percentage of industrial nitrogen may also be present in the atmosphere of the furnace as well as inter gas. When the process of cathode melting is carried out using a plasma gun, it is particularly convenient to derive the plasma effluents from nitrogen-hydrogen mixtures or nitrogen.

According to yet another aspect of carrying out this variant of the invention, the reducing and/or neutral atmospheres may be provided by bleeding suitable liquids through a series of small openings provided in the stationary annular electrode or the segments thereof.

When it is intended to alloy the processed copper or to introduce a dispersed phase of special modification of physical properties, such additions or any other additives that may be required, may be conveniently introduced into the upper portion of the furnace by entraining such additives in a stream of suitable gas and jetting them into the upper portion of the expanded plasma arc. The last mentioned technique is specially useful where relatively small quantities of additives are used. Where substantial alloying is required, the alloying components may be fed into the furnace directly at controlled rates, but preferably into the upper portion of the expanded plasma arc.

It also falls within the scope of this invention to dispense with the stationary annular electrode and instead include the copper cathode in the arc circuit. In such circumstances, the electric connection to the copper cathode entering the furnace may be conveniently arranged via electrically conducting silicon carbide plates or high current density copper impregnated graphite plates arranged in the upper portion of the rectangular channels for feeding the said copper cathodes. In such circumstances, it is convenient to utilize the A.C. expanded plasma arc, connecting each channel to one phase of the supply. A D.C. component may also be injected in such circuit to improve the arc stability as hereinbefore described.

As was mentioned before, this melting, alloying and refining aspect of the invention may also be applied to the treatment of other metals and alloys as well as metal scrap. Suitable modifications with respect to operating parameters, feeding means, composition of furnace atmospheres, type and quantitites of additives and refractories, will in such cases be introduced according to the well known existing pyrometallurgical practice.

By way of example, and without restricting the scope of invention, the furnace may be adapted to melting and refining high melting point metals such as tungsten, tantalum, niobium, molybdenum, vanadium, rhenium, chromium and metals of the platinum group. Equally, melting and refining of highly reactive metals as exemplified by titanium and zirconium may be undertaken with suitable inert atmospheres. During the melting of certain metals transferring the arc to the collected molten pool may be beneficial by means described hereinbefore.

The use of inert gas atmospheres and in particular, argon, may also be practiced within the scope of the invention on other than the highly reactive metals as mentioned hereinbefore, and may include any metals in which it is desired to lower the contaminants content.

The present invention also provides very convenient means for the introduction of fine and ultrafine particles usually comprising particles of interstitial compounds such as oxides, borides, nitrides and carbides for the purpose of dispersion strengthening of metals. The high turbulence conditions prevailing in the expanded arc column of the invention provide particularly efficient means for primary comminution of such materials to the required size and subsequent uniform distribution of the said comminuted particles in the liquid phase of the metal. For instance, it also falls within the scope of the invention to dispersion alumina alumin metal by means of titanium diboride or boron nitride substantially submicron particles.

All of the above and similar pyrometallurgical operations may be carried out by the present invention broadly in accordance with the requirements of orthodox metallurgical processes, i.e., by creating in different parts of the expanded arc furnace conditions enabling the performance of such steps as calcining, roasting, smelting, refining, etc. By strict control and maintenance of different chemical potentials of the prevalent electronegative component in different parts of the expanded arc furnace, it is possible to perform a number of such processing steps within one expanded furnace. This advantageous feature of the invention is brought about by the utilization of very high temperatures and enthalpies in the expanded arc column proper, which enables the relatively cooler effluents further removed from the said expanded arc column proper to remain at sufficiently high temperatures to carry out successfully further processing steps. However, the experimental results derived from practicing the present invention have shown nonambiguously that it can also provide an entirely new set of pyrometallurgical methods unique to very high temperature operations. These new methods were theoretically anticipated for a long time as likely features of very high temperature technology and in some cases verified by the reactions taking place in plasma effluents particularly those of the radio frequency plasmas. However, the very small throughputs and even smaller yields obtained combined with prohibitively large amounts of energy used, rendered such methods impractical for industrial applications.

As far as can be ascertained at present, the new methods of very high temperature technology intrinsic to the present invention, rely chiefly on thermal dissociation, partial ionization, and generally increased reactivities. Sometimes the distinction between the orthodox and the new methods are not clearly defined. For instance, in the hereinbefore mentioned case of treating sulphide types of ores, the ultimate appearance of elemental sulphur deposited from the gaseous extract and absence of sulphur dioxide in the same extract, could be attributed either to the thermal decomposition of the ore under reducing conditions or possibly to a very rapid roasting stage utilizing oxygen inspired with the ore followed by the decomposition of the sulphur dioxide, thus formed in the strongly reducing environment to elemental sulphur and carbon oxides. Whatever the actual mechanism of such reactions, their overall results represent considerable advantages.

The industrial applications of the expanded arc plasma furnace of the present invention are not limited to pyrometallurgy and can also be utilized in various other chemical applications namely: reduction of compounds of semimetallic elements such as reduction of silica to silicon, or boron compounds to boron; formation of compounds of the hard metals comprising formation of carbides, nitrides, borides and silicides of titanium, zirconium, hafnium, vanadium, niobium, tantalum, chromium, molybdenum; tungsten; thorium and uranium. Formation of oxides, nitrides, cyanides, cyanonitrides, borides and silicides of other metals where such compounds exist, including formation of any of the above compounds in nonstoichiometric ratios and formation of any mixtures of the above compounds. In particular, the method is applicable to formation of high purity oxides of aluminum, magnesium, beryllium and titanium.

Formation of specialized refractory materials and particularly formation of any of the alumino silicates falls also within the scope of the invention.

According to yet another aspect of the invention, particles of a refractory material may be coated while passing through the expanded arc column containing suitable constituents or precursors of the constituents to be deposited. This aspect of the invention is considered of special importance and will be described hereinafter more fully with reference to an example.

The expanded arc furnace of the invention may also be used for the purpose of comminution with simultaneous spheroidization and refining. In particular it may be used for manufacture of spheroidized metal powders of high purity and controlled size distribution substantially within 3–6 microns. Such powders have been hitherto produced at relatively low temperatures by the formation and subsequent decomposition of carbonyls of the given metals, a method which is rather expensive and limited to metals forming the said carbonyls.

The particular examples as listed hereinafter do not imply limitation of the method of the present invention, but are included solely by way of illustration of a few of the many representative applications that fall within the scope of the high temperature technology based on the wide potentialities of the expanded arc columns operated substantially as hereinbefore explained.

Broadly, the method of the present invention may be used in three distinct ways:

a. by relying broadly on the orthodox steps of high temperature processes, but carried out in the regime created in the apparatus of the invention, i.e., providing much higher temperatures, optimal enthalpies, high degree of turbulence and above all, accurate control of oxygen potentials at different regions of the apparatus;

b. relying on a new approach based on rapid thermal breakdown and/or regrouping of the constituents. This variant is particularly applicable to complex oxide ores and complex sulphide ores and situations where hitherto the minerals have not responded to known beneficiation processes;

c. relying on dissociation and rapid removal of the dissociated components from the reaction zone.

Any of the above three methods may be used separately or jointly. At present, it may frequently not be possible to discern clearly which of the routes suggested is the prevailing factor.

Treatment of Copper Ores

Procedures relating to the extraction of copper from copper containing minerals, ores and concentrates providing a continuous direct reduction and separation of copper in which the resulting copper is of at least blister copper quality and the sulphur collected is substantially in the elemental state will now be described.

Feedstocks may comprise any native or mineralized sources of copper, i.e., sulphides, including the so called "grey coppers" containing in addition to iron, further cations such as antimony, arsenic, lead or combinations thereof and other complexes with cobalt and/or nickel. Less common ores comprising oxides, sulphates, carbonates, silicates and chlorides may also be employed with suitable modifications. Equally the invention is also applicable to the enrichment of low grades of copper, e.g., in which orthodox beneficiation process have failed and copper containing residues, e.g., those of pyritic origin.

Whereas the orthodox pyrometallurgy of copper sulphide ores envisages an elaborate series of discrete steps which may include inter alia roasting for partial sulphur elimination, smelting for the production of a matte which is principally a double sulphide of copper and iron followed by conversion in which silica and other fluxing material may be added, sometimes followed by further fire refining and reduction of residual oxides, the process of the present invention as will be explained below, provides a considerable simplification, the advantages of which will be immediately apparent. A full explanation of the exact path of the complex reactions that take place when copper concentrates are processed according to our invention is not known, but an outline of a feasible explanation for the results obtained is given. It should however be stressed that practice of the present invention in many respects confirms and extends the theoretical considerations of experts reviewing the efficiency of copper recovery in particular statements made in the "Review of Efficiency of Copper Recovery" by G. T. Brittingham, published by the Institute of Mining and Metallurgy, Mar. 10, 1966. Thus, it may be said that the present invention confirms in practice theoretical predictions by offering a tangible process and apparatus for achieving a continuous breakdown of multiple sulphide ore concentrates with subsequent elimination of sulphur, transfer of iron values to the gangue constituents and reduction of copper values to metallic copper with only mineral copper tenor of the slag.

According to one aspect of the invention, the recovery of copper metal from sulphidic types of copper ores or concentrates comprises: introduction of said feedstocks into the upper portion of the expanded arc plasma effluents derived substantially from nitrogen; introduction of reductants into the atmosphere of the furnace, and separating products of reactions in the first collector by allowing the upper layers of the collected materials to pour into the adjoining collector; withdrawing continuously a portion of the sulphur rich gases accumulating in the vicinity of the upper portion of the expanded arc plasma for subsequent sulphur collection; injecting further quantities of reductants at the annular electrode level or into the tail flame region; and withdrawing the bottom copper layer from the first collector.

The above processing steps may be further varied or augmented without departing from the scope of the present invention. For instance, the silica content of the feedstocks may be augmented and lime also added particularly where it is intended to obtain a copper product approximating the quality suitable for electrolytic refining. Where copper approximating the quality of blister copper is aimed at, such further additions are as a rule not required, even if the silica content of the gangue is low. It is also within the scope of the invention to add solid or liquid reductants which may comprise any substances containing carbon or hydrogen or both by mixing them with the concentrate. Under certain circumstances incomplete drying of concentrate slurries is permissible and may be beneficial as was found to be the case with some "grey coppers" concentrates. Also the plasma effluents may be derived from other than chiefly nitrogen sources, particularly hydrogen, hydrocarbon and other reducing gases may be advantageously introduced. Where the concentrates hold large quantities of iron and other economical factors are suitable, the iron rich fraction collecting in the adjoining collector may be further reduced, e.g., to pig iron, adding to the products overflowing from the first collector further quantities of reductants required for the formation of a metal phase and tapping the said metal phase at the bottom of the said adjoining collector while withdrawing the supernatant slag at a higher level in the adjoining collector. Ores containing other constituents in addition to iron may also be treated and in such cases the more volatile constituents will appear in the gaseous products removed from the vicinity of the upper zone of the expanded arc column, in which case the products may, if in the sulphide state, be separately reduced or if they appear in their elemental state, easily separated from the elemental sulphur. The heavier or less reactive components of such ores will be retained chiefly in the slag layer and may be subsequently extracted by any of the orthodox methods. Gold and silver contents do not appear to respond to such separations presumably due to their too close similarity to copper and are retained in copper.

EXAMPLE I

An expanded arc furnace in the form of a scaled down, laboratory installation substantially as shown in the accompanying FIGS. 1, 2, operating with a plasma gun delivering 50 kw power to the expanded arc column in the shape of a truncated cone similar to that shown in FIG. 4, and of approximately 20 cm length and 10 cm diameter at the annular electrode, was employed. The rotor assembly carrying the circulating plasma gun revolved at 400 rpm. The plasma effluents were derived from nitrogen-hydrogen mixture in the ratio of 4:1 v/v, and a small amount of argon. The total flow of gases was kept during starting at 80 cfh but was reduced after transferring the arc to the annular electrode and expanding and extending the column to 45 cfh. A 20 kg sample of bornite concentrate (with suspected chalcocite intrusions) containing 48 percent Cu, 18 percent S, 8 percent Fe, the rest being gangue, was obtained as an incompletely dried slurry which was crushed and passed through a 500 micron sieve. Prior to the introduction of the furnace, the above concentrate was mixed with 10 percent of pulverizing coke and injected into the furnace in a stream of propane gas at a rate of 20 cfh of propane. The concentrate was fed into a preheated furnace at a rate of approximately 10 g per second for a period of 33 minutes when all the sample was dispensed. The expanded arc column was maintained for another 3 minutes after which the crucible was tapped and the furnace allowed to cool and the products removed for inspection and analysis. Accordingly, the products collected in the duct venting the upper portion of the furnace comprised solidified glassy deposits of sulphur with traces of copper sulphide present only, the latter present only in the part of the duct close to the furnace. The products tapped solidified into two distinct fractions, the bottom one containing copper approximately 98.5 percent copper content, 0.3 percent sulphur, the rest being iron, while the upper fraction contained iron particles in an iron sulphide matrix. Characteristically, no silicates were detected in that portion. Large portion of the gangue originally present (approximately 5 kg) had been volatilized together with more than 45 percent of iron originally present. The above example was carried out with a low power input, primarily in order to establish the overall course of reactions; the installation used was giving rise to considerable thermal losses chiefly due to its small size and therefore relatively large surface to volume ratio and the need for maintaining many additional openings for the purpose of monitoring the operational parameters.

As is well known to those skilled in the art, it is possible to include a number of energy conserving and similar steps such as partial or total recirculation of flues for the purpose of drying the entering concentrates, equally cooling the sulphur rich gases below the condensation point of sulphur in order to remove the latter and using a portion of either or both of the above gases for entrainment of the feedstocks prior to introduction to the expanded plasma arc furnace. All of which steps fall within the scope of the present invention.

The invention may also include means for measuring and monitoring chemical potential in the upper portion of the furnace by mounting a suitable probe in the wall of the furnace and another similar probe in the wall of the collector and making the amount of reductants entering into the vicinity of the expanded arc and in the tail flame or counter electrode region dependent on such readings so as to provide optimal dynamic conditions for the ultimate separation of the main constituents, as well as means for sampling the gaseous streams issuing from the furnace. The above modifications are applicable generally to all expanded arc furnace processes falling within the scope of the present invention.

Titaniferous Ores

This application of the invention and the accompanying Examples II and III relate to the extraction of iron and titania from the titaniferous ores containing varying amounts of iron oxides. Such ores, e.g., ilmenites, are plentiful and capable of easy concentration yielding typically iron values ranging from 26 percent to 48 percent and titania from 35 percent to 48 percent.

However, the customary pyrometallurgical processes are frequently found to be not feasible for the processing of such ores. Thus the orthodox smelting processes leave too high percentage of iron in the titania slag and vice versa the iron obtained contains too high percentage of titania to render such processing economically feasible.

This aspect of the present invention provides an efficient method and apparatus for the processing of titaniferous ores containing varying amounts of iron oxides, into iron metal containing substantially less than 1 percent titanium and a titania rich fraction containing substantially more than 90 percent titania.

It is well known that the amount of titania in iron and vice versa are controlled by the oxygen potential value at the interface of the two molten fractions. By adjusting and maintaining these values at two stages of the process, it was found possible to obtain the two main components relatively free from each other, while the remaining constituents derived from the gangue were largely volatilized.

The reducing atmosphere or the expanded arc furnace may be conveniently derived from hydrocarbon gases carbon, carbonaceous matter, ammonia or mixtures thereof. Nitrogen may be used as a part of the expanded arc effluents.

The more oxidizing atmospheres established in the second vessel may be achieved by introducing oxygen or oxygen enriched air or other oxidizing substances.

This aspect of the invention also provides for a substantial removal of other contaminants usually present, such as silica, calcium, oxide, magnesia, alumina and others.

Processing of ilmenites, monazites and other ores of titanium, zirconium and hafnium as well as treatment of titaniferous slags derived from smelters also falls within this aspect of the invention.

The underlying principle of the separation is based on exposing the concentrate with the added reductants to the expanded arc column under reducing conditions sufficient to produce substantially pure iron, i.e., with only a very small quantity of titanium and transferring the slags formed in the first collector through a "reverbatory stage" as hereinbefore described into the adjoining collector. The slag leaving the first collector is exposed to a substantially oxidizing atmosphere resulting in the removal of the residual iron and the aluminosilicates derived from the gangue with simultaneous reoxidation of the titanium oxide to the dioxide level.

The above method was tested on two types of titaniferous concentrates of the following approximate compositions:

| | Concentrate I | Concentrate II |
|---|---|---|
| $TiO_1$ | 54% | 30.1% |
| $Fe_2O_3$ | 17.5% | 39.6% (Total Fe) |
| FeO | 24% | |
| $Al_2O_3$ | 0.03% | 8.9% |
| $V_2O_5$ | 0.15% | 0.01% |
| MnO | 1.5% | 0.01% |
| $SiO_2$ | 0.5% | 8.3% |
| $Nb_2O_5$ | 0.15% | n.d. |
| MgO | 0.2% | 5.5% |
| CaO | 0.01% | 1.8% |

Both concentrates were mixed with 10% by weight of pulverized coke and 2 percent by weight of sodium carbonate.

EXAMPLE II 20 kg of concentrate I ground to less than 500 microns with the above additives was introduced to the expanded arc furnace substantially as described in the foregoing Example I, but in addition an oxidizing jet of compressed air was introduced at the side of the adjoining collector (shown as duct 17 of FIG. 3) in counter current to the slag advancing through the reverbatory passage between the collectors. The concentrate mixture was similarly entrained in propane gas fed at a rate of 20 cfh. The rate of concentrate feed was maintained at approximately 9 g per second and introduced to a preheated furnace. During a period of injection lasting approximately 42 minutes, the first collecting crucible was tapped twice: after 20 minutes interval and at the end of the injection period. The first tap was continued only for a few seconds, while during the second tapping all the liquid products were tapped. At the end of the concentrate injection the expanded arc column and the air blast were maintained for another one minute and the second crucible tapped. The product of the first tapping was found to be 98.4 percent Fe containing 0.2 percent Ti, the second tapping of the first crucible yielded iron and slag fractions, the iron contained 97.9 percent Fe and 0.25 percent Ti, while the upper slag contained 90.1 percent titanium oxides (as $TiO_2$) and 3.1 percent total Fe (as oxides). Few globules of metallic iron found in this slag were not included in the above analysis. The slag tapped from the second crucible, i.e., slag which was exposed to the oxidizing blast, gave 94.6 percent $TiO_2$; ($Ti_2O_3$ was not detected), and 1.4 percent total Fe.

EXAMPLE III

In this example, 20 kg of concentrate II was used with the same additives. All other operating parameters were the same but the rate of concentrate feed was reduced to 7.5 g per second. The results were considerably poorer, namely the first tapped iron fraction contained 95.2 percent Fe, and 0.7 percent Ti while slag exposed to air blast tapped from the second crucible contained 82 percent titanium oxides (as $TiO_2$) and 6.7 percent total Fe. The test was repeated adding 1.5 percent w/w MnO to the concentrate and reducing the concentrate feed rate to 6.8 g per second. The results were improved in spite of the very inferior type of concentrate, yielding in the first tapped iron fraction 96.8 percent Fe with 0.3 percent Ti while the slag exposed to air blast as tapped from the second crucible contained 90.3 percent $TiO_2$.

EXAMPLE IV

In this example 25 kg of magnetite concentrate passing through a 500 micron sieve containing 71.8 percent Fe was mixed with 4 kg of pulverized coke and 1 kg of calcium carbonate and introduced into the upper portion of an expanded arc column in a stream of propane fed at 25 cfh. The concentrate was fed at approximately 12.5 g per second. The plasma forming gases comprised nitrogen and methane in a ratio 2:1 v/v and their combined flow was reduced to 35 cfh. The rotor revolved at 500 rpm, the arc column was extended to 23 cm length and power delivered to plasma gun was kept at 60kW. The concentrate was dispensed within approximately 40 minutes yielding on tapping iron ingot weighing 17.8 kg and containing 98.3 percent Fe, 1.3 percent C and 0.3 percent Si. Similar results were obtained by replacing the solid reductant with gaseous hydrocarbons.

The next example will illustrate an entirely new path for the preparation of aluminum metal from alumina. In contrast to numerous electrothermal processes which have been proposed and which so far lead to either the fabrication of aluminum alloys containing considerable amounts of silicon and lesser amounts of iron and titanium, or to copper-aluminum alloys, the following method leads to the recovery of a fraction of substantially pure aluminum metal. This is achieved by firstly substantially vaporizing powdered alumina in hydrogen rich plasma of the expanded arc column followed by controlled reduction with methane in the tail flame region and rapid quenching with minimal formation of oxycarbides. The method may also be used with impure aluminas where the level of impurities may be reduced by withdrawing volatilized products from the upper region of the expanded arc column.

EXAMPLE V

In this example, 10 kg of 98.5 percent pure alumina passing through 125 micron sieve was preheated in the ore dispenser to approximately 850°C and injected into the upper portion of an expanded arc column at a rate of 5.5 [k] g per second. The arc plasma was derived from argon fed at a rate of 35 cfh. The expanded arc column was operated at an arc voltage of 600 volts in a truncated cone mode. The power delivered to plasma was approximately 100 kw and the length of the expanded column 36 cms. The rotor revolved at 500 rpm. The tail flame region was surrounded by a RF output coil delivering a further 10 kw of power. 15 cfh of propane was injected into the region immediately below the stationary annular electrode (but above the RF output coil), and the products were allowed to fall under gravity through a steep temperature gradient to a carbon crucible whose temperature was maintained substantially below 1,500°C. A liquid upper fraction tapped from the said crucible at two intervals 5 minutes apart, produced 93.5 percent and 96.8 percent pure aluminum.

The following example illustrates one of the many possible thermal breakdown type of reactions for which the present invention may be employed. Such reactions include also thermal decomposition of rhodonite ($MnSiO_3$), kyanite ($Al_2SiO_5$) and others.

EXAMPLE VI

In this example, 20 kg of industrial grade zircon sand, substantially zirconium silicate, passing through 355 micron sieve was introduced at a rate of 13 g per second into the upper region of the expanded arc column. The installation and operating parameters were substantially as described in Example IV hereinbefore, but for the gaseous constituents which in this case comprised substantially nitrogen with small argon additions fed to the plasma gun at a rate of 30 cfh and 15 cfh of air used to introduce the zircon sand into the expanded arc column. A small quantity of fine sodium carbonate dust was also introduced into the lower portion of the expanded arc column at a rate of approximately 5 g per minute. The products of the reactions were allowed to fall under gravity under a slight suction through a long column terminating in a funnel leading to a relatively cold collecting chamber from which they were extracted with jetting water. The small quantities of sodium silicate which were formed improved considerably the subsequent isolation of pure zirconia from silica by means of leaching.

The next example illustrates an entirely different industrial application of the present invention. It has been known that the hot strength and other properties of high purity alumina refractories may be improved by admixing small quantities of silica which result ultimately in the formation of a fine mullite matrix. However, the present methods are not always adequate, involving cumbersome and expensive procedures which seldom guarantee uniform development of an intergranular mullite matrix. In contrast to these, the method illustrated below provides high degree of uniformity by developing on all grain surfaces a uniform yet extremely thin layer of mullite.

EXAMPLE VII

In this example, 50 kg of high purity, low porosity alumina in the form of substantially spherical particles of approximately 2 cms in diameter was injected into the upper region of the expanded arc column operated in a narrow cylindrical tube made of high purity fused silica. Similarly, the rotor body protecting refractory was also made of fused silica. Argon was used at a rate of 25 cfh in the plasma forming effluents and the total power delivered to the plasma gun was 120 kw. The arc length of 33 cms was established in a truncated conical shape with the rotor revolving at 600 rpm. High grade alumina refractories were used below the stationary annular electrode level. The annular electrode was recessed in the refractories. The alumina spheres were preheated in a refractory box and entered the upper region of the furnace by rolling under gravity through two cylindrical silica tubes inclined tangentially to the circumference of the furnace and placed diametrically opposite each other. The spheres were falling at a rate of approximately 2 spheres per second corresponding to approximately 23 g per second, and were allowed to fall into a gently sloping and wide collector filled with silica sand.

After cooling, a low glancing angle, long time exposure X-ray diffraction pattern showed substantially the same diffraction pattern as that obtained with a pure mullite sample in a 21 cms Debye-Sherrer powder camera.

The next sample illustrates yet another important industrial application of the present invention in the field of spheroidization of metal powders. Current practice of manufacturing spheroidized particles of nickel and iron in the 5 microns range is limited to the cumbersome and expensive carbonyl process. According to this aspect of the present invention, 5 micron range iron and nickel spheroidized powders may be prepared from a cheap source, namely iron and nickel flakes.

EXAMPLE VIII

In this example, 20 kg of flaked iron of high specific area was introduced in the upper region of an expanded arc column at a rate of 9 g per second in a stream of 10 cfh of argon. The plasma gun effluents were derived also from argon fed at a rate of 25 cfh. The power supplied to the plasma gun was 60 kw. The arc column was of 30 cms length and the internal diameter of the annular electrode 8 cms. The products of spheroidization were cooled in a downward flow and collected in a water cooled copper cyclone. Small amounts of submicron particles formed which escaped the action of the cyclone were removed by electromagnetic precipitation. The product consisted substantially of fully spheriodized particles with a mean distribution size approximately at 4.8 microns. Very occasionally "necking," i.e., interparticle coalescence, was observed.

I claim:

1. A plasma furnace for treatment of materials comprising at least one upper electrode capable of movement along its own longitudinal axis and coacting with a lower annular stationary electrode, means moving said upper electrode in a substantially closed arcuate path with respect to said stationary electrode, means establishing an electrically conductive path between said upper and said lower electrodes, means developing a radially expanded plasma column between said electrodes, means introducing feedstocks into said plasma column, means conducting further substances into the plasma effluents issuing from said annular electrode, means collecting, quenching, separating and discharging the products issuing from the vicinity of said annular electrode, a cooling system associated with said electrodes, and a furnace body containing the electrode assemblies product collecting vessels and conducting means.

2. A plasma furnace as claimed in claim 1 in which the longitudinal axis of the moving electrode generates a latus rectum of a cone.

3. A plasma furnace as claimed in claim 1 in which the longidutinal axis of the moving electrode generates a latus rectum of a cylinder.

4. A plasma furnace as claimed in claim 1 in which the moving electrode is substantially nonconsumable.

5. A plasma furnace as claimed in claim 1 in which the moving electrode comprises a plasma gun.

6. A plasma furnace as claimed in claim 5 in which the moving electrode is consumable.

7. A plasma furnace as claimed in claim 6 in which the consumable electrode is in the form of a hollow conduit.

8. A plasma furnace as claimed in claim 5 in which the plasma gun is of the arc-constricting type.

9. A plasma furnace as claimed in claim 1 in which selectively the expanded arc column or its effluents are augmented by the imposition of an alternating electromagnetic field.

10. A plasma furnace as claimed in claim 9 in which the alternating electromagnetic field is derived from an output coil of a radio frequency generator.

11. A plasma furnace as claimed in claim 8 in which the discharge is initiated in the nontransferred arc mode and is thereafter made to operate in a transferred arc mode by establishing an electrically conducting path to the stationary electrode.

12. A plasma furnace as claimed in claim 1 in which the stationary electrode is of substantially annular shape.

13. A plasma furnace as claimed in claim 12 in which the stationary annular electrode comprises a plurality of segments.

14. A plasma furnace as claimed in claim 1 in combination with means for lowering and raising the circulating electrode for the purpose of starting the discharge and transforming it into an axially extended and radially expanded configuration.

15. A plasma furnace as claimed in claim 1 in combination with means for circulating the moveable electrode in a closed path.

16. A plasma furnace as claimed in claim 2 in which the resulting plasma column is of at least a portion of a truncated conical shape.

17. A plasma furnace as claimed in claim 16 in which at least part of the latus rectum of the truncated conical discharge is bounded by curves ranging substantially from exponential to ellipse evolute types.

18. A plasma furnace as claimed in claim 1 including a source of direct current.

19. A plasma furnace as claimed in claim 1 including a source of alternating current.

20. A plasma furnace as claimed in claim 19 in combination with a direct current component.

21. A plasma furnace as claimed in claim 8 in which the rate of flow of plasma forming effluents is substantially reduced.

22. An arc furnace comprising an expanded arc column as claimed in claim 21 including means for passing effluents through at least one annular electrode in combination with means for introducing feedstocks and atmospheres and means for collecting separating and discharging the products.

23. An arc furnace as claimed in claim 22 including means to introduce feedstocks into the upper region of the expanded arc column.

24. An arc furnace as claimed in claim 22 in which part of the furnace atmosphere is provided from the fluids circulating in the annular electrode.

25. An arc furnace as claimed in claim 22 including in combination means for collecting products in a first collector, means conducting the products collected in the first collector into at least one further adjoining collector, means exposing the products to the modifying influence and means for selectively withdrawing a continuous supply or batches of products from the collectors.

26. An arc furnace as claimed in claim 22 in which the arc is transferred to the first collector or products contained therein.

27. An arc furnace as claimed in claim 22 with means for withdrawing gaseous products or parts thereof accumulating in the vicinity of the expanded arc column.

*28. A plasma furnace for treatment of materials comprising at least one upper electrode capable of movement along its own longitudinal axis and coacting with a lower annular stationary electrode, means moving said upper electrode in a substantially closed arcuate path with respect to said stationary electrode, means establishing an electrically conductive path between said upper and said lower electrodes, means developing a radially expanded plasma column between said electrodes, means introducing feedstocks into said plasma column, means collecting the products issuing from the vicinity of said annular electrode, a cooling system associated with said electrodes, and a furnace body containing the electrode assemblies product collecting vessels and conducting means.*

*29. A plasma furnace for treatment of materials comprising at least one upper electrode capable of movement along its own longitudinal axis and coacting with a lower annular stationary electrode, means moving said upper electrode in a substantially closed arcuate path with respect to said stationary electrode, means establishing an electrically conductive path between said upper and said lower electrodes, means developing a radially expanded plasma column between said electrodes, means introducing feedstocks into said plasma column, means collecting and quenching the products issuing from the vicinity of said annular electrode, a cooling system associated with said electrodes, and a furnace body containing the electrode assemblies product collecting vessels and conducting means.*

*30. A plasma furnace for treatment of materials comprising at least one upper electrode capable of movement along its own longitudinal axis and coacting with a lower annular stationary electrode, means moving said upper electrode in a substantially closed arcuate path with respect to said stationary electrode, means establishing an electrically conductive path between said upper and said lower electrodes, means developing a radially expanded plasma column between said electrodes, means introducing feedstocks into said plasma column, means collecting, quenching and separating the products issuing from the vicinity of said annular electrode, a cooling system associated with said electrodes, and a furnace body containing the electrode assemblies product collecting vessels and conducting means.*

*31. A plasma furnace for treatment of materials comprising at least one upper electrode capable of movement along its own longitudinal axis and coacting with a lower annular stationary electrode, means moving said upper electrode in a substantially closed arcuate path with respect to said stationary electrode, means establishing an electrically conductive path between said upper and said lower electrodes, means developing a radially expanded plasma column between said electrodes, means introducing feedstocks into said plasma column, means collecting, quenching, separating and discharging the products issuing from the vicinity of said annular electrode, a cooling system associated with said electrodes, and a furnace body containing the electrode assemblies product collecting vessels and conducting means.*

*32. A plasma furnace for treatment of materials comprising at least one upper electrode, capable for movement along its own longitudinal axis, mounted above and coacting with an annular stationary electrode, means for establishing an electrically conductive path between said upper electrode and said stationary electrode, means for moving said upper electrode in a substantially circular path about the axis of the stationary electrode with sufficient velocity to develop a radially expanded plasma column between said upper electrode and said stationary electrode, means introducing feedstocks into said plasma column and a furnace body containing said stationary electrode.*

*33. A plasma furnace for treatment of materials comprising at least one plasma gun, capable for movement along its own longitudinal axis, mounted above and coacting with an annular stationary electrode, arranged substantially horizontal, means for establishing an electrically conductive path between said plasma gun and said stationary electrode, means for moving said plasma gun in a substantially circular path about the axis of the stationary electrode with sufficient velocity to develop a radially expanded plasma column between said plasma gun and said electrode, means introducing feedstocks into said plasma column at a location above said stationary electrode, collecting means for collecting products issuing from the vicinity of said stationary annular electrode and a furnace body containing said stationary electrode and collecting means.*

*34. A plasma furnace for treatment of materials comprising at least one plasma gun, capable of movement along its own longitudinal axis, said plasma gun being mounted above and coacting with an annular stationary substantially horizontal electrode, said plasma gun being mounted longitudinally slidable in a rotor which is substantially coaxial with and spaced apart from said stationary electrode, said plasma gun being mounted in said rotor in an inclined position in relation to the axis of said rotor, the axis of said plasma gun being directed substantially at said stationary electrode, means for sliding said plasma gun in said rotor whereby to bring said plasma gun into close proximity with said stationary electrode to establish an electrically conductive path between said plasma gun and said electrode and to move said plasma gun away from said stationary electrode when a plasma arc has been established, means for rotating said rotor about its axis at a sufficient velocity to expand such plasma arc into a radially expanded plasma column extending between said plasma gun and said stationary electrode, means for introducing feedstocks into said plasma column and a furnace body containing said stationary electrode.*

* * * * *